United States Patent [19]

Lazorchak

[11] Patent Number: 5,185,542
[45] Date of Patent: Feb. 9, 1993

[54] ELECTROMAGNETIC PULSE OPERATED BI-STABLE BRAKE

[75] Inventor: Edward D. Lazorchak, Ho-Ho-Kus, N.J.

[73] Assignee: Electroid Company, Springfield, N.J.

[21] Appl. No.: 750,941

[22] Filed: Aug. 28, 1991

[51] Int. Cl.⁵ .............................................. H02K 49/10
[52] U.S. Cl. ......................................... 310/36; 310/92; 310/105
[58] Field of Search ..................................... 310/12,15,17,36,92,93,103,105

[56] References Cited

U.S. PATENT DOCUMENTS 4,788,463 11/1988 Layh ................................... 310/77

FOREIGN PATENT DOCUMENTS

| 0138071 | 6/1987 | Japan | 310/12 |
| 0065654 | 3/1990 | Japan | 310/12 |
| 0065655 | 3/1990 | Japan | 310/12 |
| 1-534666 | 1/1990 | U.S.S.R. | 310/12 |

Primary Examiner—Steven L. Stephan
Assistant Examiner—Judson H. Jones
Attorney, Agent, or Firm—Anthony D. Cipollone

[57] ABSTRACT

A unique electromagnetic brake which, when pulsed with a D.C. current, will latch and hold in either of two extreme positions; on position and off position. A continuous current is not necessary to maintain either position which eliminates power loss from a limited power supply and heat dissipation problems.

10 Claims, 3 Drawing Sheets

ELECTROMAGNETIC PULSE OPERATED BI-STABLE BRAKE

BACKGROUND OF THE INVENTION

1. Field of the Invention

The present invention relates generally to electromagnetic brakes more particularly to an improved electromagnetic brake which will latch and hold in either of two extreme positions. on position and off position when pulsed with a D.C. current.

2. Prior Art

U.S. Pat. No. 2,421,751 deals with friction devices having relatively rotatable faces that are brought in gripping engagement electromagnetically.

U.S. Pat. No. 2,562,788 relates to electromagnetic brakes of the disk type.

U.S. Pat. No. 2,703,378 relates to an improvement in construction of a magnetic friction clutch disclosed in U.S. Pat. No. 2,488,552 so as to facilitate accurate manufacture thereof by high production methods.

U.S. Pat. No. 3,251,444 deals with clutches and brakes in which an axial magnetic pull generated by suitable exciter coils is utilized to cause controlled engagement of the friction clutch members.

U.S. Pat. No. 3,351,162 relates to an electromagnetic braking mechanism for rapidly stopping a movable flat member or rotative disc.

U.S. Pat. No. 3,618,720 deals with a magnetic particle clutch or brake constituted by a stator surrounding a rotor assembly having an input member and an output member which are intercoupled when the stator coil is excited.

U.S. Pat. No. 3,730,317 relates to a new and improved magnetic coupling and more specifically to a magnetic coupling wherein one of the coupling members is formed of a material which is readily magnetized to different polarities to effect a movement of the coupling members between an engaged and disengaged position.

SUMMARY OF THE INVENTION

A method of using a D.C. pulse activated electromagnetic system to latch and hold a brake in two extreme positions (on and off) without the use of continuous electrical energy for indefinite periods of time. The electrical supply source is conserved especially when limited in size. There is no dissipation of heat which is an added advantage when heat may be a problem. Simple reversal of polarity of the D.C. current source with a short duration pulse changes the unit from one position to another. Sensors may be used in conjunction with the invention to indicate the position of the armature plate which indicates whether a brake is on or off. The invention becomes very useful in space, robots, sophisticated weapons and airborne systems where the foregoing advantages become critical to the operation.

BRIEF DESCRIPTION OF THE DRAWINGS

A fuller understanding of the invention will be achieved after consideration of the following Description of the Preferred Embodiment as it relates to the accompanying drawings which include.

DETAILED DESCRIPTION OF THE PREFERRED EMBODIMENT OF THE INVENTION

Figure 1:
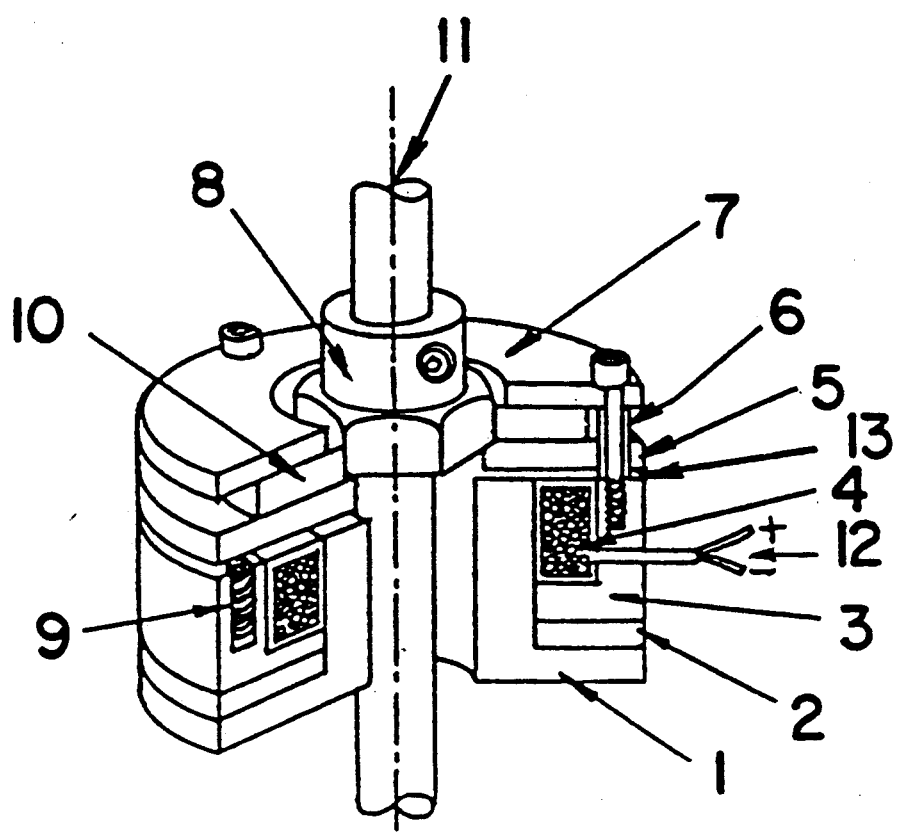
FIG. 1. Partially broken away perspective view of the invention showing the interior and operating parts of the invention.

Referring to FIG. 1, the perspective view, there is an inner cylinder (1) with a broad base which becomes an inverted "T" shaped solid cylinder surrounding a shaft (11). The inverted "T" shaped cylinder or inner cylinder (1) is surrounded by a "donut" comprising two components, both solid cylinders, a lower and "washer" type cylinder which is a magnet (2) around the inverted "T" shaped cylinder and over its base and a deeper solid outer cylinder (3) above magnet (2) which surrounds the inverted "T" shaped solid in which is embedded in said outer cylinder (3) at the upper quadrant an electromagnetic coil (4) around the inverted "T" shaped cylinder (1) to which are attached electrical wires (12) for current flow.

Resting on top of the aforedescribed cylinders is an armature plate (5) the shape of a "washer" around said shaft (11) above which is a friction plate (10) similar in shape to the armature plate (5) but of a smaller radius with a pressure plate (7) "layered" above the said friction plate (10) with a similar "washer" shape and of slightly smaller diameter than the armature plate (5). The friction plate (10) and pressure plate (7) form a hollow cylinder around the hub (8) which is embedded in the friction plate (10) and forms a single unit. When this unit is pushed upward against the pressure plate (7) by the springs (9) which are embedded in the outer cylinder (3) when an electric current is applied to wires (12) in such a polarity such as to overcome the magnet (2) and release the spring (9) to push upward on friction plate (10). Three spacers and screws (6) are embedded at equidistant locations on the outer edges of the pressure plate (7) through the friction plate (10), outside of the diameter of the armature plate (5) and outer cylinder (3) to adjust the spacing (13) between the outer cylinder (3) and armature plate (5) for the springs (9) to act.

Figure 2:
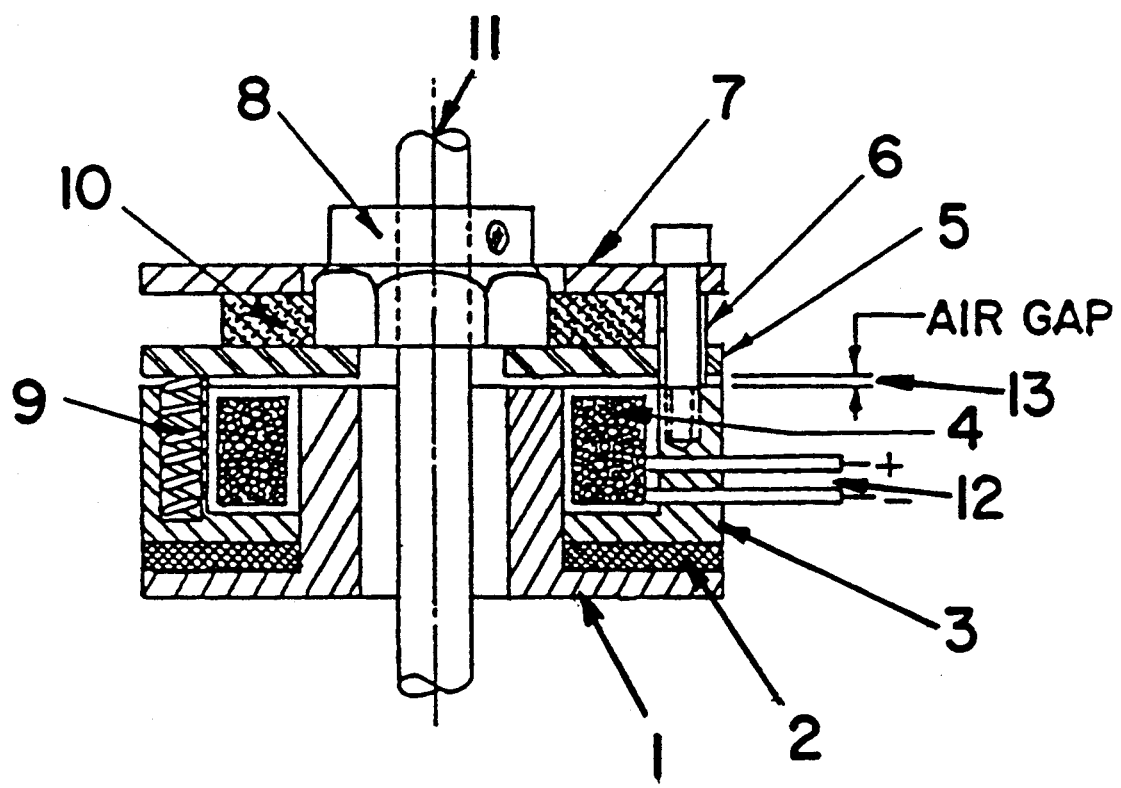
FIG. 2. Cross-sectional view of the invention in which the unit is in the brake (torque) position.

FIG. 2, the cross-sectional view of the invention, shows the friction plate (10) and armature plate (5) pressed against pressure plate (7) by the springs (9) resulting in an air gap (14) between the field coil magnet assembly and armature plate (5) showing the unit in its brake (torque) position.

Figure 3:
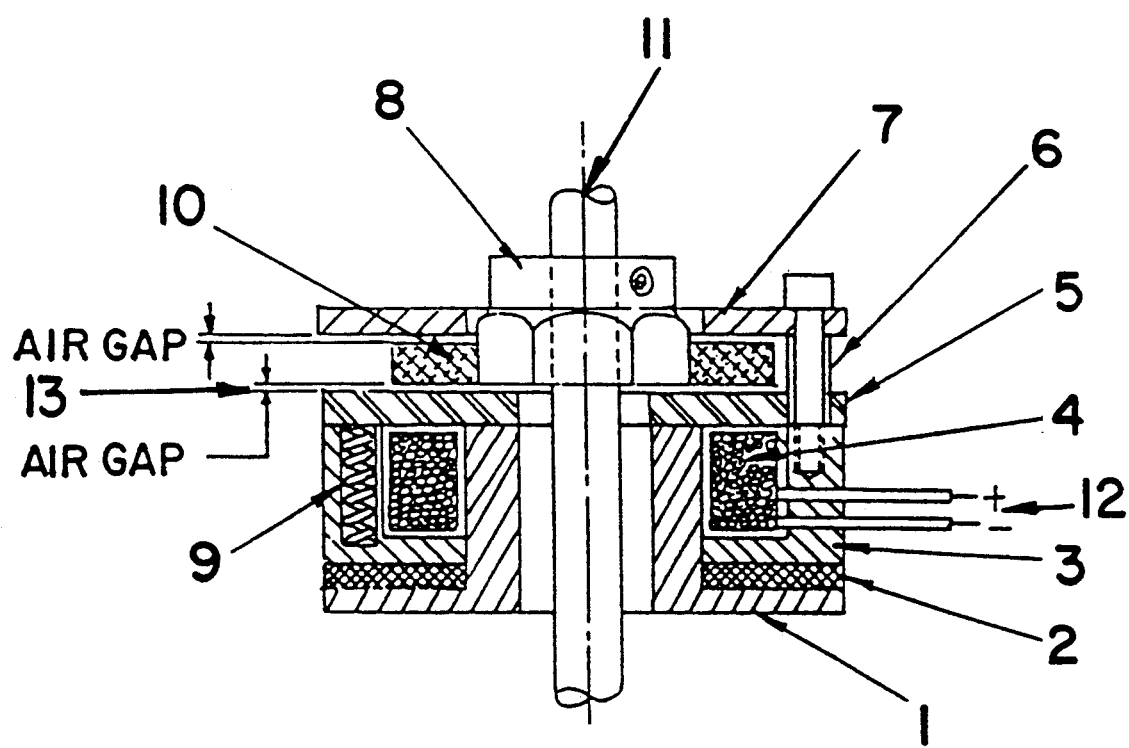
FIG. 3. Cross-sectional view of the invention in which the unit is in the open brake (no torque) position.

FIG. 3, the cross-sectional view of the invention, shows the armature plate (5) "parked" against the field coil magnet assembly. Two air gaps are produced, one between the armature plate (5) and friction material plate (10) and the second between the pressure plate (7) and the friction material plate (10) showing the unit in its brake open (no torque) position.

It is important to note throughout that the unique, simplified configuration of the invention and its structure result in the unique properties that are the basis of the instant invention.

When the unit is energized, through the lead wires (12) for a short period, generally 10 to 50 milli seconds, in a polarity direction to "buck" the magnet (2), that is overcome the magnetic attraction by the permanent magnet (2), holding the armature plate (5) down so that springs (9) are forced downward, the spring (9) push the armature plate (5) against the friction plate (10), pushing against the pressure plate (7), which force results in a static torque which will prevent the friction plate (10)

from rotating and since shaft (11, is imbedded in friction plate (10), the shaft (11) is prevented from rotating in a brake position. This force caused by spring (9) pushing in upward position remains in place as long as the armature plate (5) is in this position and requires no further energy and will remain "braked" indefinitely. Thus there is very little electrical energy loss from a limited power supply and since no electrical energy is used there is no heat dissipation which would cause problems.

Reversing the polarity of the current through lead wires (12) again, for a short period, generally 10 to 50 milliseconds, intensifies the magnetic force from the magnet (2) to attract the armature plate (5) down so that springs (9) are forced downward releasing the friction plate (10), creating an air gap (15) between the pressure plate (7) and friction plate (10) to which is imbedded shaft (11) permitting the friction plate (10) to rotate freely in a non-torque, no brake position, even when the unit is not energized and the unit will remain torque free until such time as a pulse energy is applied to "buck" the magnet (2) release the spring (9) to create torque as above. The armature plate (5) is held in place by the magnet (2).

In the instant invention, no continuous energy is required either in the brake on or brake off position, thus eliminating energy loss and heat dissipation as in other known units like Fail Safe Brakes which require continuous energy in the brakeoff position.

What is claimed is:

1. Means for controlling the rotational motion of a shaft of an electromagnetic solenoid comprising:
   A. An outer polar cylinder
   B. An inner polar cylinder
   C. An electromagnetic coil dispersed between said outer cylinder and said inner cylinder.
   D. An axially extending shaft rotationally disposed in said inner cylinder and extending through openings at both top and bottom end of inner cylinder.
   E. A magnet disposed on bottom base of said inner cylinder, said based formed by said inner cylinder having a greater diameter at its base forming an inverted "T" cylinder around said shaft with base extending to the edge of said outer cylinder.
   F. An armature plate in cylinder form disposed about said shaft above said inner and said outer cylinder.
   G. A hub consisting of a hexagonal shaped nut attached to the bottom of a circular cylinder or radius slightly larger than said shaft in cylinder from disposed about said shaft above said armature.
   H. A friction plate of cylindrical form of a radius less the armature radius disposed and attached to said hub at its hexagonal shaped nut, said friction plate being used to control the rotation or non-rotation of said shaft by its positioning
   I. A fixed pressure plate of cylindrical form disposed about said hexagonal nut but of a diameter which leaves space between said hexagonal nut and its inner diameter to permit rotation of said shaft and above said friction plate, said fixed pressure plate being held in a fixed position by three screws imbedded in equidistant positions just inside the outside diameter of said pressure plate, said screws being attached to said armature plate and said outside cylinder just inside the outside diameter of said armature plate and said outside cylinder but just on the outside of said friction plate imbedded with hub, said friction plate and said embedded hub free to rotate with said shaft, leaving an air gap between said armature plate and said outer and inner cylinder.
   J. A spring imbedded in said outside cylinder between said electromagnetic coil and the outside diameter of said outside cylinder so disposed as to be in contact with said armature plate so as to be compressed or to push upon in said armature plate as a result of magnetic field of said magnet on said armature plate; and
   K. A means for impressing a D.C. pulse of short duration to said electromagnetic coil thereby producing an electromagnetic field and whereby said magnet is caused to attract said armature plate to said outer and inner cylinder decreasing said air gap and creating a second gap between said pressure plate and said friction plate permitting said friction plate with said imbedded hub and said shaft free rotational movement which remains in free rotational movement position magnetically with the D.C. pulse terminated.

2. Means for controlling the rotational motion of a shaft of an electromagnetic solenoid in accordance to claim 1 wherein said outer cylinder is of magnetic material.

3. Means of controlling the rotational motion of a shaft of an electromagnetic solenoid in accordance to claim 1 wherein said inner cylinder is of magnetic material.

4. Means of controlling the rotational motion of a shaft of electromagnetic solenoid in accordance with claim 2 wherein said magnetic material is generally a steel alloy.

5. Means of controlling the rotational motion of shaft in claim 3 wherein said magnetic material is generally of a steel alloy.

6. Means of controlling the rotational motion of a shaft of an electromagnetic solenoid comprising:
   A. An outer cylinder;
   B. An inner cylinder;
   C. An electromagnetic coil disposed between said outer cylinder and said inner cylinder;
   D. An axially extending shaft rotationally disposed in said inner cylinder and extending through openings at both top and bottom end of inner cylinder;
   E. A magnet disposed on bottom base of said inner cylinder, said base formed by said inner cylinder having a greater diameter at its base forming an inverted "T" cylinder around said shaft with base extending to the edge of said outer cylinder;
   F. An armature plate in cylinder form disposed about said shaft above said inner and said outer cylinder;
   G. A hub consisting of a hexagonal shaped nut attached to the bottom of a circular cylinder or radius slightly larger than said shaft in cylinder form disposed about said shaft above said armature;
   H. A friction plate of cylindrical form of a radius less the armature radius disposed and attached to said hub at its hexagonal shaped nut, said friction plate being used to control the rotation or non-rotation of said shaft by its positioning with respect to said armature;
   I. A fixed pressure plate of cylindrical form disposed about said hexagonal nut but not of a diameter which leaves space between said hexagonal nut and its inner diameter to permit rotation of said shaft and above said friction plate, said fixed pressure plate being held in a fixed position by three screws imbedded in equidistant positions just inside the outside diameter of said pressure plate, said screws being attached to said armature plate and said outside cylinder just inside the outside diameter of said armature plate and said outside cylinder but just on the outside of the said friction plate imbedded with hub, leaving said friction plate and said hub free to rotate with said shaft leaving an air gap between said armature plate and said outer and inner cylinder;

J. A spring embedded in said outside cylinder between said electromagnetic coil and the outside diameter so disposed as to be in contact with said armature plate so as to be compressed or pushed up on said armature plate as a result of magnetic field of said magnet; and K. A means of impressing a D.C. pulse of short duration to said electromagnetic coil thereby producing an electromagnetic field and whereby said electromagnetic field causes the magnetic field of said magnet to decrease so that said armature plate is moved upward by said springs, increasing the air gap between said armature and said outer and inner cylinder pushing up said friction plate with said imbedded hub against said pressure plate creating a force and resultant torque preventing free rotational motion of said shaft which remains in a locked position magnetically with D.C. pulse terminated.

7. A means of controlling the rotational motion of said shaft of an electromagnetic solenoid in accordance to claim 6 wherein said outer cylinder is of magnetic material.

8. A means of controlling the rotational motion of said of an electromagnetic solenoid in accordance to claim 6 wherein said inner cylinder is a magnetic material.

9. A means of controlling the rotational motion of said shaft of electromagnetic solenoid in accordance with claim 7 wherein said magnetic materials generally a steel alloy.

10. A means of controlling the rotational motion of said shaft in claim 8 wherein said magnetic material is generally of a steel alloy.

* * * * *